United States Patent
Siepker et al.

(10) Patent No.: US 6,279,692 B1
(45) Date of Patent: Aug. 28, 2001

(54) PARKING BRAKE SYSTEM

(75) Inventors: Achim Siepker; Wolfgang Reis; Harald Boedrich, all of Munich; Johann Niklas, Haimhausen; Thomas Ziebarth; Axel Gutt, both of Munich, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/194,156

(22) PCT Filed: May 20, 1997

(86) PCT No.: PCT/EP97/02569

§ 371 Date: Jun. 29, 1999

§ 102(e) Date: Jun. 29, 1999

(87) PCT Pub. No.: WO97/44221

PCT Pub. Date: Nov. 27, 1997

(30) Foreign Application Priority Data

May 21, 1996 (DE) .............................................. 196 20 463
May 15, 1997 (DE) .............................................. 197 20 422
May 15, 1997 (DE) .............................................. 197 20 423

(51) Int. Cl.$^7$ ...................................................... F16D 65/14
(52) U.S. Cl. ........................ 188/105; 188/162; 74/388 R
(58) Field of Search ............................... 188/105, 106 P, 188/106 F, 162, 157, 156, 2 D; 74/388 R, 530, 529, 523, 501.6

(56) References Cited

U.S. PATENT DOCUMENTS

| | | | |
|---|---|---|---|
| 5,178,237 | 1/1993 | Ursel et al. | 188/106 P |
| 5,417,624 | 5/1995 | Weissbrich et al. | 477/71 |
| 5,769,189 | * 6/1998 | Heibel et al. | 188/156 |

FOREIGN PATENT DOCUMENTS

| | | |
|---|---|---|
| 40 23 705 | 1/1992 | (DE) . |
| 41 29 934 | 3/1993 | (DE) . |
| 42 29 042 | 3/1993 | (DE) . |
| 42 05 588 | 8/1993 | (DE) . |
| 195 17 485 | 11/1996 | (DE) . |
| 5-286424 | 11/1993 | (JP) . |
| 95/27642 | 10/1995 | (WO) . |

* cited by examiner

Primary Examiner—Robert J. Oberleitner
Assistant Examiner—Pamela J. Rodriguez
(74) Attorney, Agent, or Firm—Crowell & Moring LLP

(57) ABSTRACT

The parking brake of a vehicle is operated by a power-generating generating actuating unit 4. For maintaining the function of the parking brake in the event of a failure of the power operating device 1, an emergency operating device 2 is provided which can be operated by muscle force. Both operating devices 1, 2 have mechanical transmissions 5, 12 which act upon a common threaded spindle 3 for tensioning and releasing the parking brake. By way of the mutual self-locking design of the mechanical transmission 5, 12 which depends on the type of operation, it is achieved that both operating modes (power or muscle force) can be carried out in any sequence and without any limitation of the adjusting path(s).

27 Claims, 5 Drawing Sheets

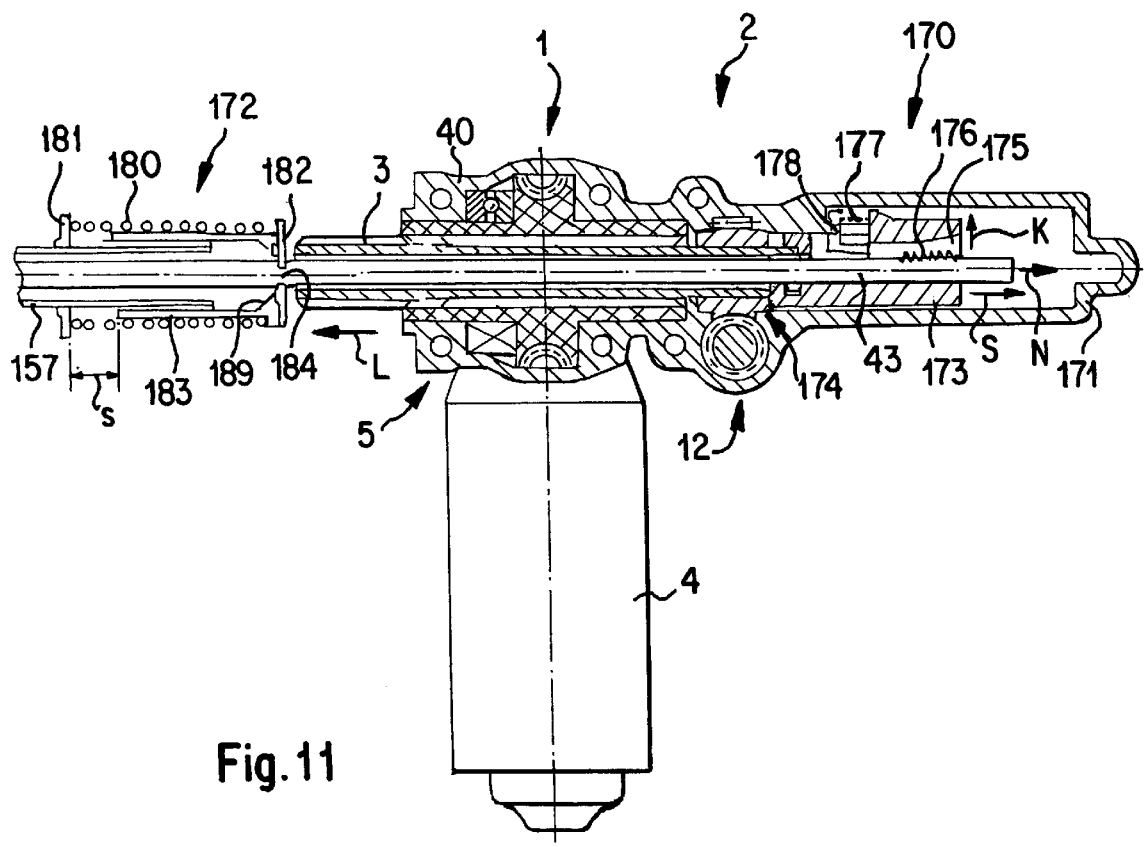
Fig. 11
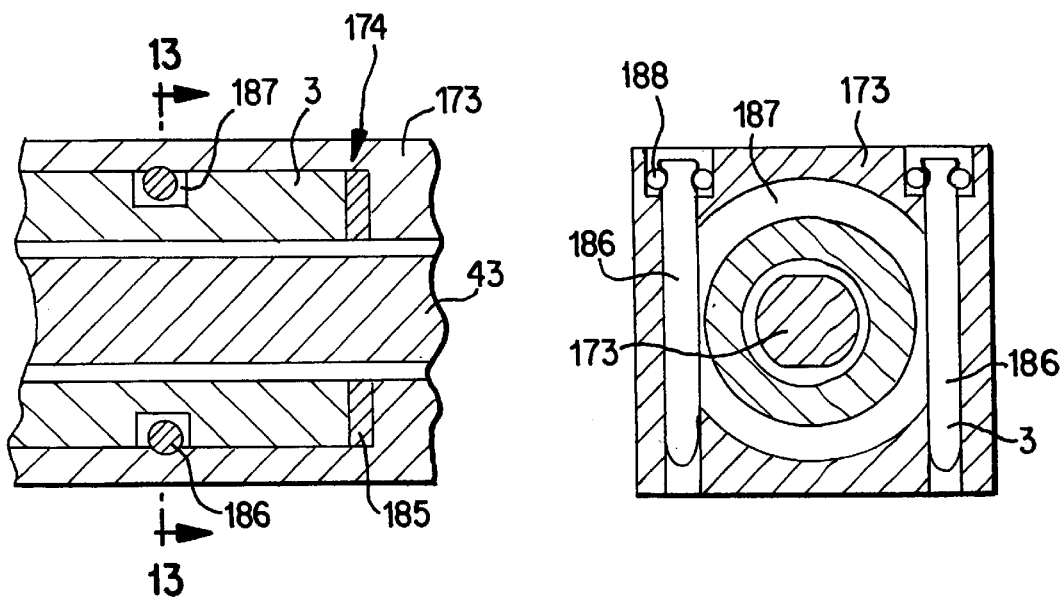
Fig. 12
Fig. 13

PARKING BRAKE SYSTEM

The invention relates to a parking brake system according to the preamble of Claim 1.

From German Patent Document DE 41 29 934 C2, a parking brake system is known, in the case of which, as a rule, the parking brake is operated by a motor-driven actuating unit. By way of a threaded spindle, the actuating unit drives a spindle nut which carries a two-armed coupling lever. By way of the first lever arm of the coupling lever, the parking brakes of the vehicle are operated. A muscle-force-operated emergency operating device is applied to the second lever arm by way of a cable pull.

It is an object of the invention to provide a triggering device for a parking brake whose power operating device and emergency operating device interact such that, independently of the preceding type of operation (power or muscle force) an operation of the parking brake is possible without limitation from any position of the triggering device by means of power as well as by means of muscle force.

This object is achieved by means of the characteristics of Claim 1. In this case, it is the core idea to cause both devices to act by way of mechanical transmissions directly onto the threaded spindle. As the result of the used mechanical transmission, a simple and compact construction is obtained while simultaneously the weight is low. Both mechanical transmissions may be arranged in a common housing. The mechanical transmissions may be designed and mutually coordinated such that an unlimited operation is possible by means of power as well as by means of muscle force.

According to Claim 2 and 3, the mechanical transmissions of the emergency operating device and of the power operating device are preferably designed as worm gear systems. Worms gear systems are distinguished by their low space requirements. As the result of the mutually crossing shafts of the worm and of the worm gear, advantages are obtained with respect to the various possibilities of the arrangement of the individual components of the triggering device, particularly of the emergency operating device, because shaft angles S can be implemented which deviate from 90°.

Claim 4 describes an alternative with a straight-toothed gear of the emergency operating device, whereby a rotation of the threaded spindle is prevented in a simple manner (see Claims 5 to 7).

Naturally, other mechanical transmissions (such as bevel gear pairs, spur gears, etc.) can also be used according to the load, ratio, position of shafts, etc.

According to Claim 5, for the normal power operation, the threaded spindle, which is secured against a rotation, is pushed in the axial direction through the worm gear operated by the actuating unit. This pure linear movement is converted into an adjusting movement on the parking brake.

According to the advantageous further development of the invention according to Claim 6, for the normal power operation, the mechanical transmission of the emergency operating device is designed in a self-locking manner. As the result, the threaded spindle on the part of the mechanical transmission of the emergency operating device is prevented from rotating in a simple manner.

Claim 7 suggests a longitudinal groove in the threaded spindle by means of which the threaded spindle is connected, for example, by means of an adjusting spring, with the gear wheel of the emergency operating device in a non-rotatable manner and in the process displaceably in the axial direction. As an alternative, the form closure can take place, for example, by way of a flattening on the threaded spindle. The longitudinal groove or the flattening may be arranged either inside or outside the thread area of the spindle. In the former case, a short constructional length is obtained of the unit consisting of the power operating device and the emergency operating device which, however, results in increased manufacturing expenditures (deburring of the thread in the area of the groove or flattening). If the longitudinal groove is arranged outside the thread area, the spindle must be lengthened by the amount of the adjusting range.

Another possibility consists of fixedly connecting the gear wheel of the emergency operating device with an intermediate shaft which, in turn, is axially displaceably and non-rotatably (for example, by way of an adjusting spring) guided in a hollow threaded spindle, whereby the constructional length of the threaded spindle can be reduced.

Claim 4 describes another alternative of a protection against rotation with a degree of freedom in the axial direction, in the case of which the linear guiding of the threaded spindle is taken over by the straight toothing, which extends in the longitudinal direction of the threaded spindle, of the gear of the emergency operating device fixedly connected with the threaded spindle. It should be taken into account in this case, that the width of the toothing must be constructed corresponding to the adjusting path of the threaded spindle plus the required covering.

If the target conflict between a small ratio and a self-locking locking in the mechanical transmission of the emergency operating device allows no self-locking toothing geometry, the protection against a rotation must be represented by a separate locking element. The locking element may, for example, be constructed while utilizing the transmission ratio as a spring-loaded ball or frictional element. The self-locking can also be represented by means of an increased coefficient of friction of the bearing of the mechanical transmission of the emergency operating device.

Analogously, according to Claim 8, during a muscle force operation of the parking brake system, the threaded-spindle-side gear of the power operating device is fixed with respect to a rotation. As a result, during an emergency operation, the threaded spindle screws through the stationary gear and in this manner causes an axial displacement of the threaded spindle with a resulting operation of the parking brake. The fixing of the worm gear in the mechanical transmission of the power operating device can take place, for example, by a self-locking design of this mechanical transmission or by increased friction (Claim 9).

Naturally, by a reversal of the effect, analogously, the gear wheel of the power operating device can be non-rotatably and axially displaceably connected with the threaded spindle. In this case, during the power operation, the threaded spindle screws through the gear wheel of the emergency operating device while, during the emergency operation, a purely linear movement of the threaded spindle takes place.

By the alternating locking of those gear wheels of the power operating device and the emergency operating device which are in a direct contact with the threaded spindle, it is achieved, in combination with the non-rotatable arrangement of one of the two gear wheels, that an alternating between the operation by power and by muscle force is arbitrarily possible, independently of the respective preceding operating mode. In the case of the described triggering device, a resetting into an initial or reference position is not required. The full remaining adjusting path is available for both operating modes in any arbitrary spindle position.

Between the threaded spindle and the wheel brakes of the vehicle, for operating the parking brake, a power transmission device is provided, for example, in the form of a linkage or of a Bowden cable arrangement. Since, during an emergency operation (or in the case of the described corresponding reversal of the effect in the case of the power operation), the threaded spindle is displaced not only in the axial direction, but also rotates, a bearing device must be provided corresponding to Claim 10 which prevents that, for example, the cable pull of a Bowden cable arrangement will twist. By means of the bearing device, the screwing movement of the threaded spindle is converted into a pure linear movement. The bearing device is advantageously arranged on the end section of the threaded spindle. For reasons of space, the bearing device may, however, also be used at a different position in the course of the force transmitting device.

If the threaded spindle according to Claim 11 is constructed as a hollow shaft, through which a linkage or the cable of a Bowden cable system is guided, a short constructional length of the unit consisting of the two mechanical transmissions of the power operating device and the emergency operating device is conceivable.

By means of an emergency operating device according to Claim 12 which is designed for an introduction of the muscle force by way of a rotating movement, a number of advantages can be achieved, in contrast to a linear introduction of force: The rotating movement can implement a ratio in a simple manner. Ergonomically, rotating movements are easier to carry out than linear movements. In addition, operating elements for rotating movements are distinguished by their low space requirement. In this case, the transmitting of the rotating movement to the mechanical transmission of the emergency operating device takes place by a rigid or flexible shaft, whereby the operating element can be arranged largely free with respect to the threaded spindle.

As a rule, the operating element is constructed as a grip (see Claims 15 to 17) and is arranged within the driver's reach. Since the emergency operation of the parking brake represents an exception with respect to the power operation, a separate operating element in the form of a grip may not even be necessary, in that, when the power operating device fails, the threaded spindle is moved by means of a tool which can be fitted on, for example, an Allan key from the vehicle tool set. According to the arrangement of the threaded spindle, a direct placing of the tool onto the mechanical transmission of the emergency operating device is also conceivable (eliminating the shaft).

Different grip shapes are conceivable for the operating element which are to be selected in coordination with the ratio of the mechanical transmission of the emergency operating device and of the resulting torque to be applied according to ergonomical aspects. The operating element can, for example, be constructed as a T-shaped grip, a star grip, a handwheel, a crank, etc. or as a combination of difference elements (see also Claims 15 to 17).

By means of the advantageous further development of the invention according to Claim 13, in the normal operation (power operation) of the parking brake system, the operating element is, for example, arranged in sunk manner in the interior lining of the vehicle. As a result, it is not obvious to the outside in a disturbing manner because it closes off flush with the surface of the interior lining. For the purpose of the emergency operation, the operating element is displaced out of this sunk position. According to Claim 14, this may take place, for example, by means of a telescoping shaft.

The folding grip described in Claim 15 can be used as a T-shaped grip as well as as a crank. In the folded-out gripping position (cranking function), in the case of a low torque, a large number of revolutions can be applied within a short time. When the locking force is sufficient, this permits a fast locking of the vehicle in everyday situations. If a higher locking force is required, which occurs, for example, when the parking brake is locked on courses with a significant grade or when a trailer is pulled, the parking brake locking force can be introduced by way of a T-shaped grip which offers a correspondingly large lever arm for the manual force, in which case, the operator can, however, introduce no continuous rotating movement but must continuously reach around. The combination of these two grip types in one grip element has the advantage that no loose parts exist which, depending on the requirements, must be remounted and, when not in use, may be lost.

The button (Claim 16), which can be pulled out and is integrated in a T-shaped grip, permits the use of the operating element as a T-shaped grip (as described in Claim 15) or as a crank for applying a lower torque at a higher number of revolutions.

Claim 17 describes the alternative of a shaft with joints which, when not in use, can be housed in a space-saving manner in its stretched position. For applying a rotating movement, the shaft is folded out, whereby a lever arm is created by means of which a corresponding torque can be applied, Such foldable cranks are known per se, for example, in the case of shafts for adjusting awnings or projection screens.

As described in Claim 7, the protection against a rotation of the threaded spindle can be implemented in multiple manners. In this context, Claim 18 describes the locking of the mechanical transmission of the emergency operating device by way of the form closure of the operating element in its sunk position. The flux of force during the supporting of the threaded spindle with respect to a rotation takes place by way of: the interior lining-operating element-shaft-mechanical transmission of the emergency operating device. In the moved-out position of the operating element without form closure with the interior lining, a power operating of the parking brake with a defined adjusting path is not possible and for safety reasons must be excluded with respect to the circuit.

Claim 19 describes another protection against a rotation, which has a simple construction and a reliable operation, for the threaded spindle in the event of the power operation, having a wind-around spring which locks the threaded spindle when power is introduced and permits a rotation of the threaded spindle in the case of an emergency operation. Although wind-around springs are known per se, for example, from German Patent Document DE 195 17 485 A1, the use according to the invention in a parking brake system has not been previously described. Wind-around springs can be integrated into the parking brake system at lower additional expenditures and at reasonable cost. As the result of the no longer absolutely necessary self-locking design of the mechanical transmission of the emergency operating device, a smaller ratio can be selected by means of which a reduced number of revolutions is achieved during the muscle force operation. Because of the lower transmission ratio, by means of the rising operating torque, the user receives a direct report on the brake locking force applied to the parking brake. In contrast to a locking mechanism with a spring-loaded ball, the emergency operation is not impaired by the detent moment during each revolution. With respect to the protection against rotation by means of a friction element, the operating forces are always lower. In comparison to the further alternative of an intentional increase of the coefficient of friction of the bearing in the mechanical transmission of the emergency operating device, the protection against a rotation by means of a wind-around spring is distinguished by a higher functional reliability. In contrast to protections against rotation in the form of spring-loaded toothings (ratchet principle), the suggested wind-around spring operates without noise and independently of the rotating direction.

According to Claim 20, the ends of the wind-around spring engage form-lockingly between two sections of the shaft. In this case, the transmission-side section of the shaft may also be formed directly by an element of the mechanical transmission of the emergency operating device, for example, the end section of the worm. By means of the divided shaft, the wind-around spring is triggered and, depending on the direction of the introduction of force, the wind-around effect is canceled or increased. In order to be able to concretely ensure the function of the parking brake system according to the invention, when a torque is introduced by way of the shaft of the emergency operating device, the wind-around effect of the spring is canceled while, in the case of a drive by way of the power operating device, the mechanical transmission of the emergency operating device and thus the threaded spindle is locked by way of the wind-around spring.

According to Claim 21, the wind-around spring can be arranged in a particularly simple manner directly in the housing of a triggering device for a parking brake.

By means of the rocker according to Claim 22, a direct linking of the Bowden controls to the spindle is permitted while the constructional length is short and the constructional expenditures are low. By means of the rocker, the two Bowden controls of a parking brake system can be linked directly to the triggering device, without the requirement of a separate device for dividing the parking brake force ("cable softness"). Because of the tilting mobility of the rocker, the rocker can assume an inclined position and therefore compensate Bowden cables of different lengths to the parking brakes of the two vehicle sides. Such differences in length occur, for example, because of manufacturing tolerances or because of a different elongation during the operation of the parking brake.

The spherical head of the bolt (Claim 23) forms the axial bearing for the event of an emergency operation with the rotating spindle.

According to Claim 24, the rocker and the housing, in which the power operating device and the emergency operating device are combined, are designed such that when the Bowden controls are inserted they are automatically threaded. Thus, Bowden controls can be pushed, for example, from the rear axle area of the motor vehicle through vehicle-body-side tubes to a triggering device in the area of the center console. There, they are automatically threaded into the rocker so that no additional manual working step is required.

By the integration of an adjusting device directly into the triggering device, a particularly compact and low-cost construction is achieved (Claim 25). Independently of settling and wear phenomena, the adjusting device ensures the full adjusting path of the spindle.

Claim 26 describes a triggering device with a hollow spindle and an assigned adjusting device. In this case, an intermediate link is provided in the form of a carriage with a tooth element which, when the parking brake is released, permits a relative movement (adjusting movement) between the rod and the spindle so that the rod can push through the hollow spindle corresponding to the extent of the wear or settling. A mechanism for converting this adjusting movement is described in a similar manner, for example, in International Patent Document WO 95/27642 A1.

According to Claim 27, a particularly simple mounting is possible in that the rod is pushed through the hollow spindle and then locks automatically in the tooth element. Thus, the mounting can be carried out fully automatically without any separate mounting step for fastening the rod on the spindle.

Possible embodiments of the invention will be illustrated in the drawing and described in detail in the following.

FIG. 11 is a sectional view of a triggering device having a hollow spindle and an adjusting device;

FIG. 12 is an enlarged representation of the linking area of the carriage to the threaded spindle; and FIG. 13 is a sectional representation corresponding to the sectional Line B—B in FIG. 12.

FIGS. 1 to 3 are views of different embodiments of the invention in a schematic representation. Identical components or components having the same effect are in each case marked by the same reference number.

Figure 1:
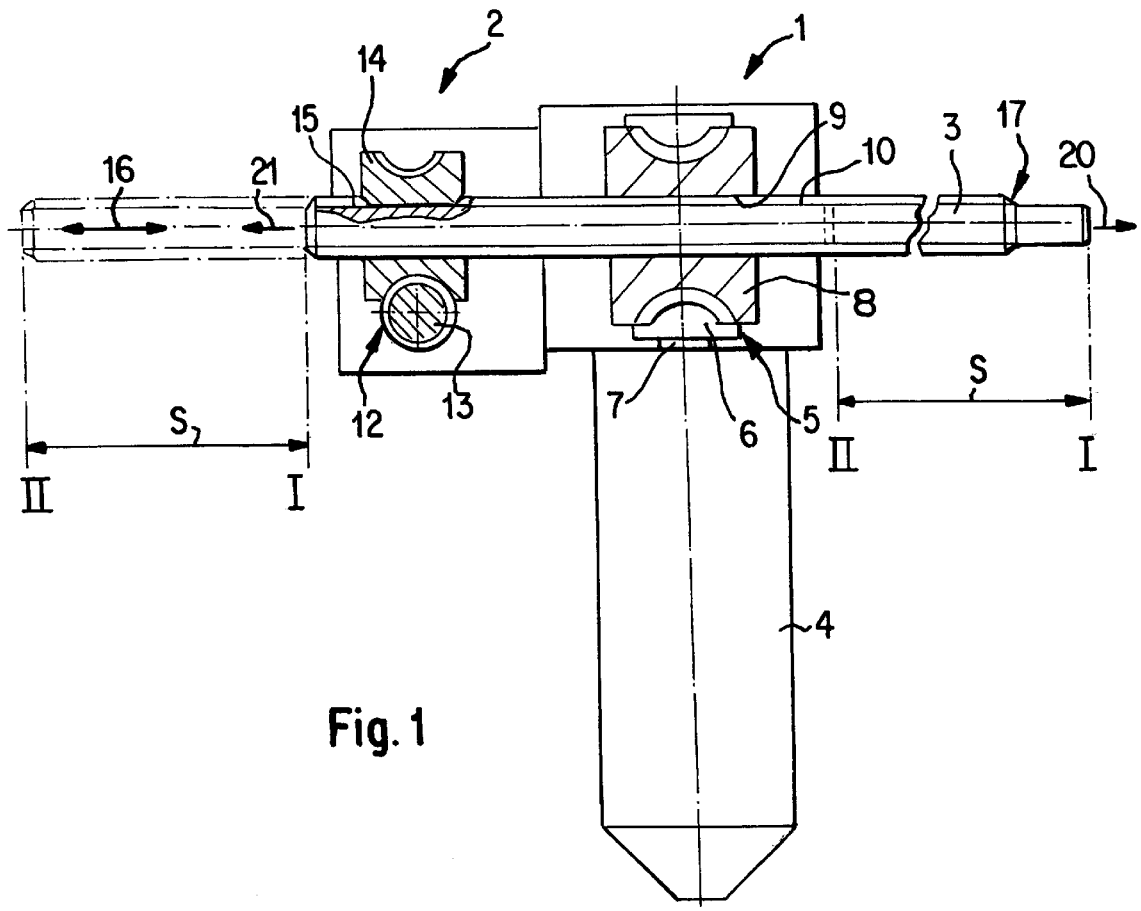
FIG. 1 is a view of a first embodiment of the invention, having two mechanical transmissions constructed as worm gears for the power operating and emergency operating device.

FIG. 1 illustrates a triggering device according to the invention for a parking brake system of a vehicle, having a power operating device 1 as well as an emergency operating device 2 which both act upon a threaded spindle 3. In a manner known per se, the power operating device 1 is composed of an actuating unit 4 formed by an electric motor as well as of a mechanical transmission 5. The mechanical transmission 5 consists of a worm 6 connected in a non-rotatable and axially fixed manner with the drive shaft 7 of the actuating unit 4 and meshing with a worm gear 8. The worm gear 8 has an internal thread 9 which interacts with a motion thread 10 on the threaded spindle 3. The actuating unit 4 is triggered by an electronic control unit which is not shown and which initiates an operation of the parking brake of the vehicle either automatically as a function of the condition of the vehicle or arbitrarily controlled by the driver.

In the event of a failure of the actuating unit 4, the threaded spindle 3 can be adjusted by muscle force by way of the emergency operating device 2. For this purpose, the emergency operating device 2 has a mechanical transmission 12 having a worm 13 and a worm gear 14. By way of a longitudinal groove 15 of the threaded spindle 3 and a spring, the worm gear 14 is non-rotatably and displaceably in the axial direction 16 connected with the threaded spindle 3.

On one of the end sections 17 of the threaded spindle 3, a bearing device 18 (see FIG. 2) is arranged, to which a force transmitting device 19 is applied for transmitting the braking force to the parking brake. The force transmitting device 19 may be formed, for example, by a brake cable or a brake linkage. The arrow 20 indicates the direction of the force which is exercised by the restoring springs of the parking brakes onto the threaded spindle 3.

For maintaining the locking braking force after the tensioning of the wheel brakes, no separate detent mechanism or the like is required because the position of the cable or of the linkage, in the power operation as well as in the emergency operation, is held by the self-locking between the motion thread 10 of the threaded spindle 3 and the internal thread 9 of the worm gear 8.

FIG. 1 illustrates the threaded spindle 3 in that position I in which the parking brake is completely released. The broken lines indicate the position II in which the parking brake is maximally pulled. The path s between the two positions I and II corresponds to the maximal adjusting path.

When the parking brake is operated by power, by way of the actuating unit 4, the worm 6 and thus the worm gear 8 are caused to rotate. Since the mechanical transmission 12 is designed to be self-locking with respect to a drive on the part of the power operating device 1, the threaded spindle 3, which by way of the longitudinal groove 15 is non-rotatably connected with the worm gear 14 of the mechanical transmission 12 fixed by means of self-locking, cannot rotate. By means of the rotation of the worm gear 8, the threaded spindle 3 is pushed, starting from the initial position illustrated in FIG. 1, in the direction of the arrow 21 toward the left through the worm gear 8 and in the process tensions the parking brake against the spring force 20. When the rotating direction of the actuating unit 4 is reversed, the parking brake is released. The length of the groove 15 must be coordinated with the maximal adjusting path s.

The manual emergency operation of the parking brake is possible from any position of the power operating device 1. By the rotation of the worm 13 and thus of the worm gear 14, the threaded spindle 3 is caused to rotate by the form closure by way of the longitudinal groove 15. Since the mechanical transmission 5 of the power operating device 1 during the drive on the part of the emergency operating device 2 is designed to be self-locking, the threaded spindle 3 screws through the worm gear 8. In this case, the threaded spindle 3 is adjusted in the axial direction 16. This adjustment of the threaded spindle 3 can take place from any position along the whole residual adjusting path s. Inversely, from any position of the emergency operating device 2, the actuating unit 4 also has the whole residual adjusting path s available.

Figure 2:
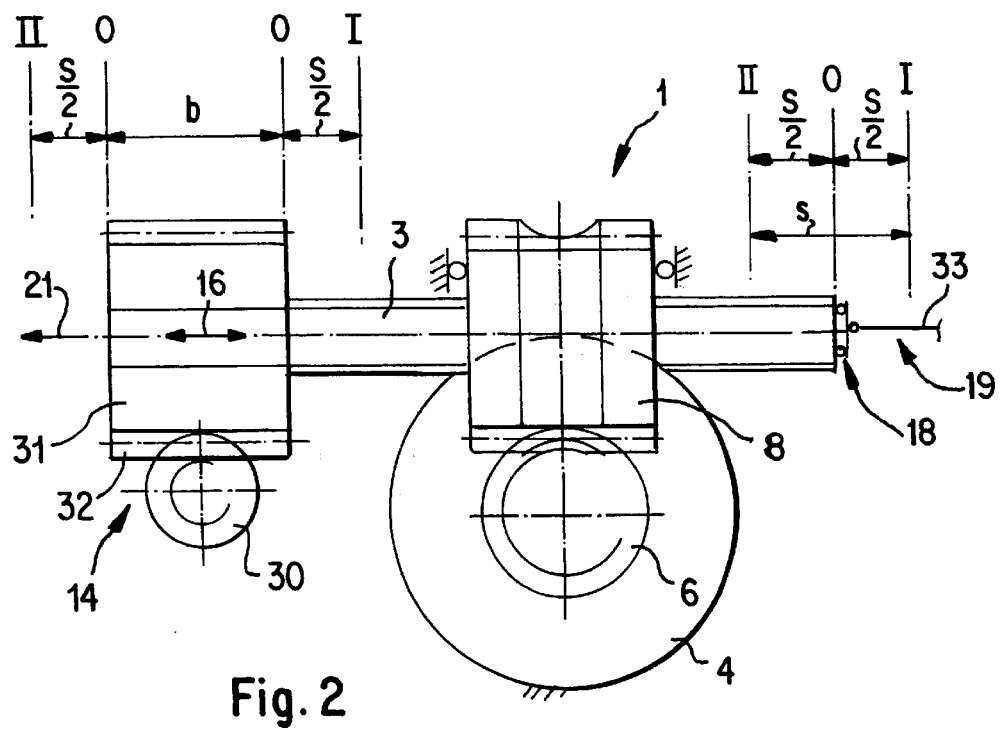
FIG. 2 is a view of a second embodiment of the invention with a pairing of a straight-toothed gear wheel and a worm on the emergency operating device.

FIG. 2 illustrates another embodiment of the invention in which the emergency operating device 2 has a mechanical transmission 12 with a skew gear 30 and a straight-toothed gear wheel 31. The gear wheel 31 is rigidly connected with the threaded spindle 3. The power operating device 1 has the construction illustrated in FIG. 1. The straight toothing 32 of the gear wheel 31 extends in the axial direction 16 and replaces the longitudinal groove 15 of the first embodiment. The width b of the gear wheel 31 should be dimensioned corresponding to the maximal adjusting path s. Positions I and II indicate the two extreme positions of the threaded spindle 3 and of the gear wheel 31. Starting from the center position 0, half the adjusting path s/2 is available in both directions.

During the power operation, the self-lockingly designed mechanical transmission 12 prevents a rotating of the threaded spindle 3 which is supported by way of the gear wheel 31 on the gear wheel 30. The movement of the threaded spindle 3 in the axial direction 16 takes place along the straight toothing 32 of the gear wheel 31.

Inversely, when the parking brake is adjusted by way of the emergency operating device 2, the threaded spindle 3 is caused to rotate by way of the skew gear 30 and the gear wheel 31. As described by means of the first embodiment, the position of the skew gear 30 to with respect to the gear wheel 31 does not change in this case. Since, in addition to the axial movement in the direction of the arrow 16, the threaded spindle 3 also carries out a rotational movement, a bearing device 18 is provided which prevents a twisting of the force transmitting device 19 constructed as a brake cable and generates a purely linear movement in the axial direction 16.

Figure 3:
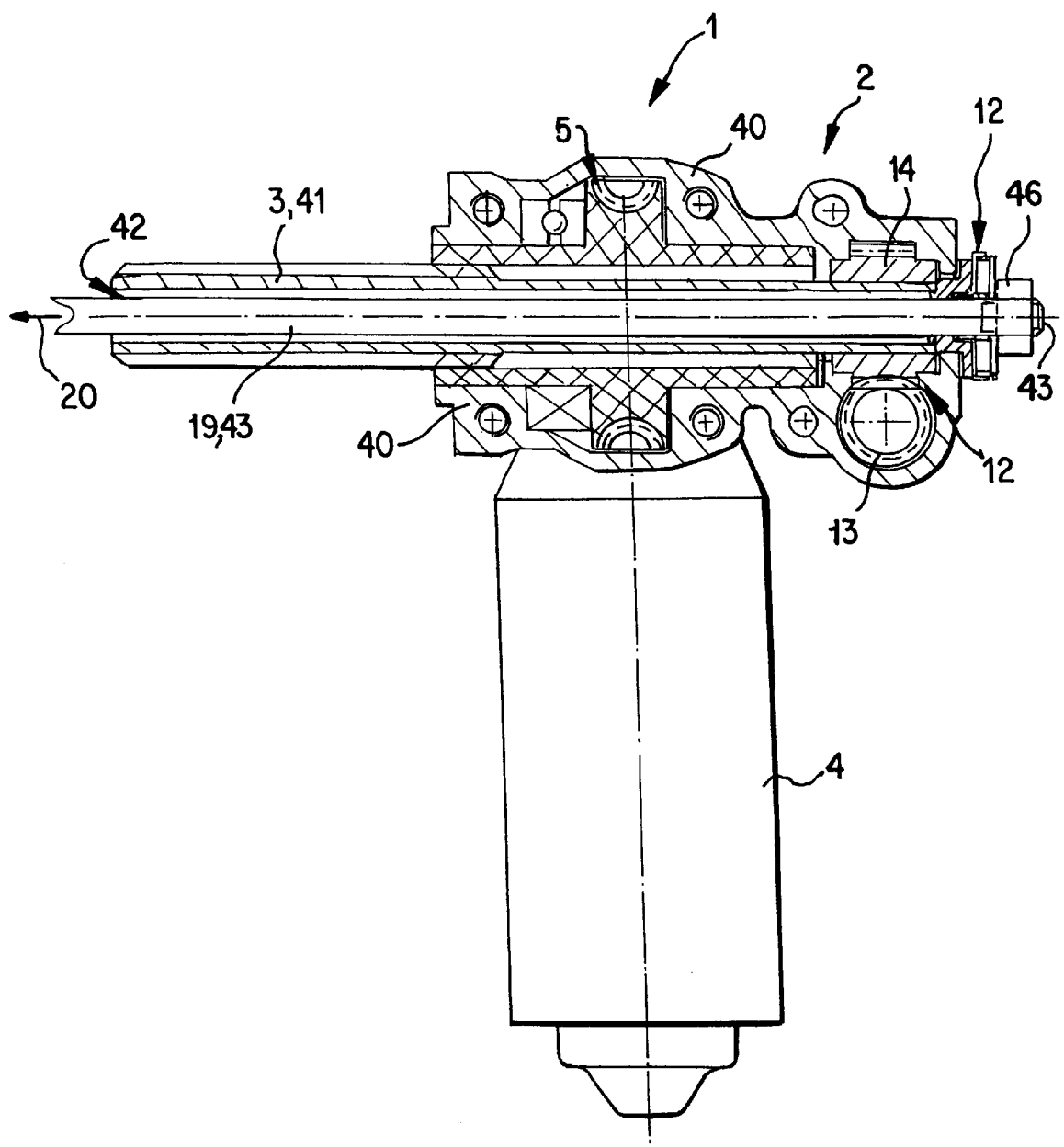
FIG. 3 is a view of a third embodiment of the invention with a threaded spindle constructed as a hollow shaft.

FIG. 3 illustrates a triggering device for a parking brake with a housing 40 in which the mechanical transmissions 5 and 12 of the power operating device and the emergency operating device 1 and 2 are arranged together. In this case, the threaded spindle 3 is constructed as a hollow shaft 41 and, in its interior 42, accommodates a force transmitting device 19 constructed as a rod 43. The guiding of the rod 43 in the interior 42 of the hollow shaft 41 results in a reversal of the direction of the force 20 with respect to the two preceding embodiments. By way of a bearing device 18, which causes an uncoupling from the rotating movement of the threaded spindle 3, as well as by way of a screwed connection 46 with the threaded spindle 3, the rod 43 is connected with the threaded spindle 3. If a bearing device 18 with a slight internal friction (such as a needle bearing) is selected, a protection against a rotation of the force transmitting device 19 is not required.

Figure 4:
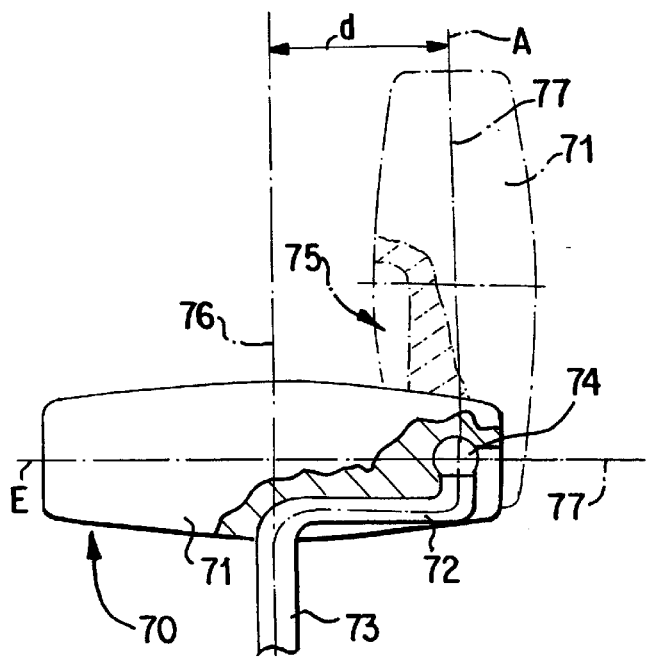
FIGS. 4 to 6 are views of embodiments of operating elements of the emergency operating device.

The operating element 70 according to FIG. 4 consists of a crowned grip end 71 which has a longitudinal axis 77 and is arranged on the bent end section 72 of a shaft 73 of the transmitting device. The grip end 71 is illustrated by means of solid lines in its folded-in position E and is illustrated by means of broken lines in its folded-out position A. The folding is permitted by means of a ball joint 74. In position E, the transmission of the torque takes place from the T-shaped grip end 71 to the cranked end section 72 by way of a form-closure-generating recess 75 on the bottom side of the grip end 71 without any relative movement between the shaft 73 and the grip end 71. In position A, a lever arm d is created with respect to the longitudinal axis 76 of the shaft 73, by way of which the operator can introduce a torque into the shaft 73 by means of a cranking motion. In this case, the ball joint 74 ensures that the grip end 71 does not rotate along in the operator's hand.

Figure 5:
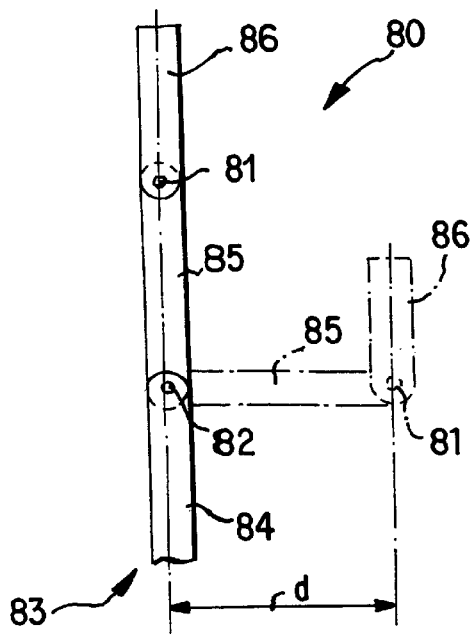

FIG. 5 illustrates an operating element 80 which is formed by a shaft 83 of the transmitting device itself. For this purpose, the shaft 83 is divided by two joints 81 and 82 into the individual sections 84, 85, and 86. The solid lines indicate the position of the shaft 83 in its inoperative position. The broken line shows the folded-out center section 85 as well as the upper section 86 which extends in parallel to the lower section 84. By the folding-out, a lever arm d is created which permits an introduction of force by means of a cranking motion. The upper section 86 can be provided with a rotatably mounted attachment which permits a rotating-along in the operator's hand. The foldable shaft 83 will offer special advantages if the lower section 84 of the shaft 83 can be telescoped, so that the shaft 83 can be sunk in an opening only by the size of the shaft diameter and can be moved out, for example, by the push of a button by way of a spring-loaded detent mechanism.

Figure 6:
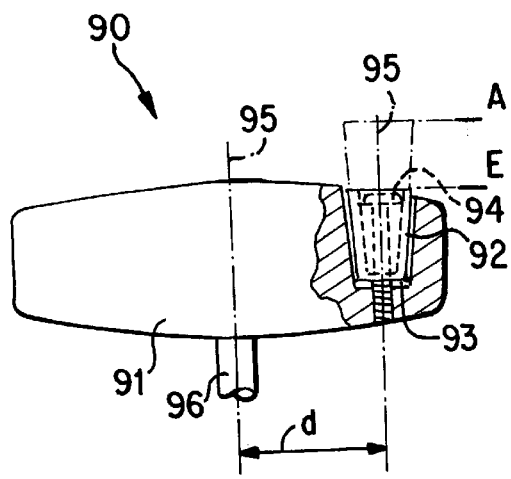

The operating element 90 according to FIG. 6 has a grip end 91 which, on one side, contains a truncated-cone-shaped button 92. The button 92 is illustrated by means of solid lines in its sunk position E, in which it disappears in an indentation 93 of the grip 91. The pulled-out position A-of the button 92 is illustrated by a broken line. The position A is limited toward the top by a screw 94. The screw 94 is used as an axis of rotation for the button 92. For applying a large torque to the shaft 96 of the transmitting device, the grip 91 itself is used. For applying low torques (lever arm d with respect to the longitudinal axis 95 of the shaft 96), the button 92 is pulled against the force of its weight out of the indentation 93 and the operating element 90 is rotated in the sense of a crank by way of the button 92. The automatic resetting of the button 92 generated by its own weight after a use is advantageous. Because of the height of the button 92 required for reasons of ergonomics a slightly larger height of the grip 91 is created.

Figure 7:
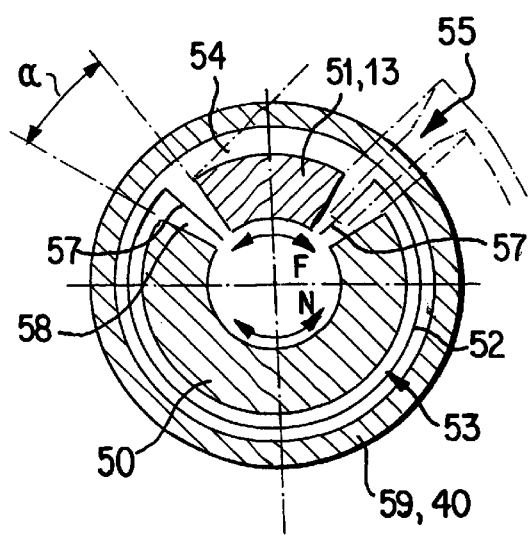
FIG. 7 is a cross-sectional view of the shaft of the emergency operating device in the area of the wind-around spring.

FIG. 7 illustrates a shaft, which as a whole has the reference number 53, for introducing a rotating movement to the mechanical transmission of the emergency operating device. The shaft 53 is divided into an operator-side section 50 and into a transmission-side section 51. The shaft 53 may also be constructed such that the point of separation is situated at the transition to the worm 13 of the emergency operating device so that the section 51 is formed directly by the worm 13. The two sections 50 and 51 engage in one another in a form-locking manner in that section 51, by means of its nose-shaped projection 54 fills a recess 55 of section 50 (see perspective view indicated by a broken line). Between the two sections 50 and 51, one space 58 respectively is provided in the circumferential direction which permits a small limited angle of rotation γ between the two sections 50 and 51.

A wind-around spring 52, which in the sectional view is shown only by means of one coil, but in reality has a plurality of helically arranged coils, engages by means of its inwardly bent end sections 57 in the spaces 58 between the two sections 50 and 51. Since, in the illustrated embodiment, the separation of the two sections 50 and 51 took place close to the mechanical transmission of the emergency operating device, the wind-around spring 52 can be accommodated under prestress by a stub-shaped attachment 59 of the housing 40 (see FIG. 3).

The function of the wind-around spring 52 will be explained in the following: When the shaft 53 is driven by way of the operator-side section 50, because of the limited rotatability of section 50 with respect to section 51, the wind-around spring 52 is contracted in both rotating direction (double arrow N); that is, the wind-around spring 52 detaches from the cylindrical interior side of the housing stub 59. Thus, the shaft 53 can be driven in both rotating directions N; that is, when a torque is introduced by way of the emergency operating shaft 53, the protection against a rotation is canceled; the shaft 53 will rotate (together with the wind-around spring 52) so that the worm 13 and thus the spindle are driven. In this case, the torque is transmitted by way of the form closure between the recess 55 and the nose 54 of the two shaft sections 50 and 51 as well as the intermediate end section 57 of the spring 52.

In the power operation, the worm 13 and therefore section 51 first attempt to rotate along under the effect of the power. However, in this case the wind-around spring 52 is expanded in both rotating directions of the section 51 (double arrow F), that is, is pressed more against the interior surface of the housing stub 59. As a result, the shaft 53—and thus the worm 13 and the threaded spindle—are reliably prevented from rotating.

Figure 8:
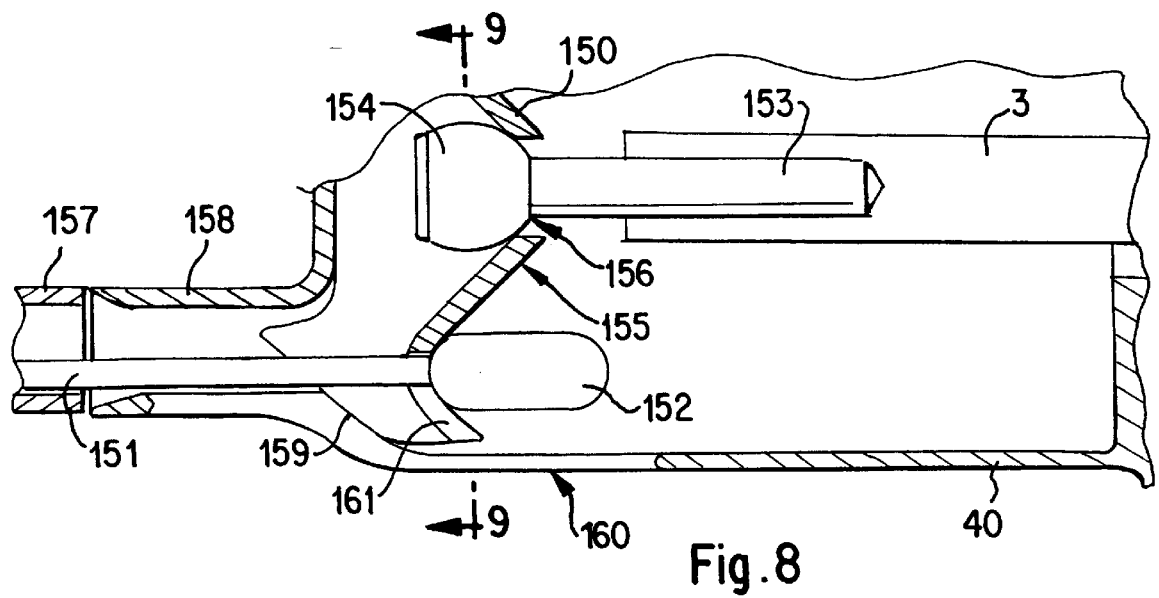
FIG. 8 is a view of an embodiment of the invention with a triggering device having a rocker.
Figure 9:
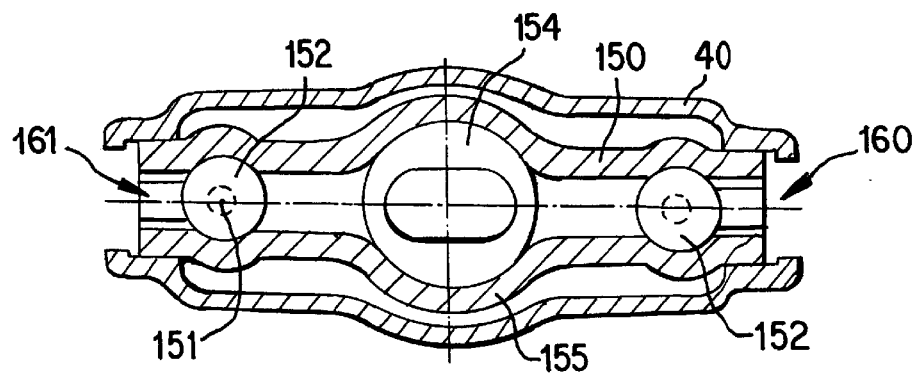
FIG. 9 is a sectional view along the sectional Line A—A in FIG. 8.

FIGS. 8 and 9 illustrate a first embodiment of a rocker 150 by means of which Bowden cables 151 (only one Bowden cable is illustrated) are linked to a triggering device for a parking brake. The Bowden cables 151 lead directly to the parking brakes at the rear axle of the motor vehicle and have nipples 152 on their rocker-side end. The rocker 150 is connected with the threaded spindle 3 by means of a bolt 153. The bolt 153 has a spherical head 154 as a counterpart to a socket-shaped recess 155 of the rocker 150.

Corresponding to the oblong-hole-shaped opening 156 in the recess 155, the rocker can tilt in the case of uneven lengths of the Bowden cables 151. The ball socket 155 of the rocker 150 ensures the rotatability of the spindle 3 with respect to the rocker 150 in the event of an emergency operation. The rocker 150 is guided so that it is protected against a rotation with respect to the housing 40 of the triggering device.

For introducing the Bowden cables 151, these are fed to the triggering device by way of a vehicle-body-side tube 157 which is directly adjoined by a tube-shaped stub 158 of the housing 40. By means of a stop slope 159 on the rocker 150, the nipples 152 are guided diagonally to the outside through a lateral outlet opening 160 of the housing 40. After passing through the nipple 152, the cable 151 slides by way of a slot-shaped recess 161 of the rocker 150 back into the housing 40 and automatically takes up the end position illustrated in FIGS. 8 and 9.

The bolt 153 is, for example, screwed, pressed, etc. to the spindle 3. Naturally, the rocker 153 may also be linked to a hollow spindle according to FIG. 3. For reducing the friction between the head 154 and the socket 155, the contact area is provided with a slidable and low-wear coating and/or a lubricant.

Figure 10:
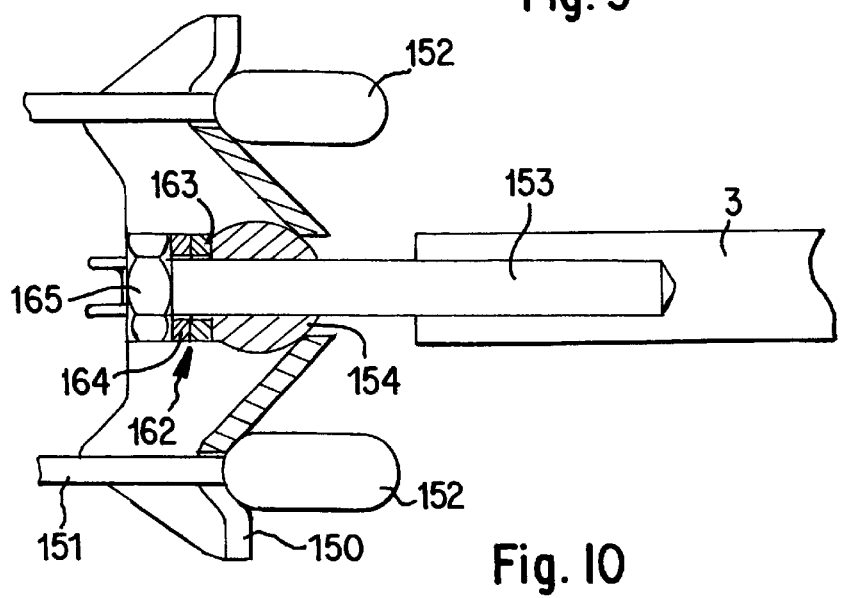
FIG. 10 is a view of another embodiment of the object of FIG. 8.

In the case of a variant according to FIG. 10, an axial bearing point 162 is provided between the bolt 153 and the head 154. The axial bearing 162 may, for example, be constructed as a needle bearing or—as illustrated in FIG. 3—in the form of stop disks 163 and 164 of a plastic material with a low coefficient of friction. Thus, when the spindle 3 is rotating (emergency operation), the head 154 and the disk 163 remain inoperative, while the bolt 153 together with the fastening screw 165 and the disk 164 rotate along.

FIGS. 11 to 13 illustrate a triggering device analogous to FIG. 3 with an adjusting device which, as a whole, has the reference number 170 and which is housed in an expansion 171 of the housing 40. A spring device 172 on the opposite side of the triggering device interacts with the adjusting device 170 and exercises a prestressing onto the rod 43.

The adjusting device 170 has a carriage 173 which is displaceably carried along with the threaded spindle 3 by means of an axial bearing 174. In this case, the carriage 173 is protected against a rotation in the housing section 171. The carriage 173 accommodates a tiltably disposed tooth element 175 with an approximately L-shaped cross-section. On the button side of the tooth element 175, a toothing 176 is provided which interacts with a corresponding toothing 176 of the rod 43. A spring 177 holds the tooth element 175 in its position illustrated in FIG. 11 in which the carriage 173 is situated close to a stop 178 of the housing 40.

The spring device 172 consists of a spring 180 whose prestressing is lower than the restoring force of the spring elements in the parking brake. The spring 180 is arranged between the supporting plate 181 of a vehicle-body-side tube 157 and a disk 182. In this case, a supporting cylinder 183 for guiding the spring 180 rests against the disk 182 which engages in a ring groove 184 of the rod 43. The supporting cylinder 183 and the tube 157 engage in one another such that an adjusting path s is available.

During an operation of the parking brake by power, by way of the electric motor 5 and the mechanical transmission 5, the threaded spindle 3 is pushed through the stationary mechanical transmission 12 of the emergency operating device 2. Together with the spindle 3, the carriage 173 is moved in the direction of the arrow S. By way of the toothing 176, the tooth element 175 of the carriage 173 takes along the rod 43 which thereby tensions the parking brake.

For releasing the parking brake, the electric motor 4 is driven in the opposite direction, whereby the threaded spindle 3 and the carriage 173 move corresponding to the arrow L. When the parking brake is completely released, the tooth element 175 rests against the stop 178 of the housing 40. Because of the geometrical conditions and under the effect of the spring 177, the tooth element 175 will now tilt upward in the direction of the arrow K so that the form closure of the toothings 176 of the tooth element 175 and the rod 43 is eliminated. In the case of a play in the force transmitting device of the parking brake which has occurred, for example, as the result of settling or wear phenomena, the spring 180 of the spring device 172 is now capable of displacing the rod 43 in the direction of the arrow N and thus keep the whole arrangement play-free. When the parking brake is tensioned again, the toothing 176 will be engaged again as the tooth element 175 lifts off the stop 178, so that the rod 43 is form-lockingly connected with the carriage 173 and thus with the threaded spindle 3 and can tension the parking brakes.

In the event of an emergency operation, the axial bearing 174 in the form of a plastic disk 185 which is enlarged in FIG. 12 separates the rotating threaded spindle 3 from the carriage 173.

The sectional representation of FIG. 13 is an enlarged view of the linking of the carriage 173 to the threaded spindle 3. In this case, two locking pins 186 in the carriage 173 engage in a groove 187 of the threaded spindle 3. The locking pins 186 are secured, for example, by means of O-rings against an unintentional removal. FIG. 6 shows the flattened cross-section of the rod 43 which carries the toothing 176 on the top side of its rearward section.

For mounting the rod 43, it is pushed through the tube 157 and the already mounted spring device 172. Stop slopes 189 on the end section of the supporting cylinder 183 ensure the secure threading-in of the rod 43 into the hollow spindle 3. As the rod 43 passes through the carriage 173, the toothings 176 slide along one another until the play-free end position is reached. Finally, the disk 182 is inserted in the ring groove 184 of the rod 43.

What is claimed is:

1. Parking brake system for a vehicle, having a power operating device, which, by way of an actuating unit, drives a threaded spindle which acts upon the parking brake, and having an emergency operating device for operating the parking brake by muscle force in the event of a failure of the power operating device, wherein the power operating device as well as the emergency operating device each have a direct mechanical transmission for adjusting the threaded spindle.

2. Parking brake system according to claim 1, wherein the mechanical transmission of the emergency operating device is formed by a worm, which can be driven by way of muscle force as well as by a worm gear which interacts with the worm and which drives the threaded spindle.

3. Parking brake system according to claim 1, wherein the mechanical transmission of the power operating device is formed by a worm which can be driven by the actuating unit as well as by a worm gear which interacts with the worm and which drives the threaded spindle by way of an internal thread.

4. Parking brake system according to claim 1, wherein the mechanical transmission of the emergency operating device is formed by a skew gear which can be driven by way of muscle force as well as by a straight-toothed gear wheel which interacts with the skew gear and which drives the threaded spindle.

5. Parking brake system according to one of the preceding claims, wherein, in the power operation, the threaded spindle is fixed with respect to a rotation.

6. Parking brake system according to claim 5, wherein the non-rotatable support of the threaded spindle takes place by the self-lockingly designed mechanical transmission of the emergency operating device.

7. Parking brake system according to claim 1, wherein the threaded spindle has a longitudinal groove or a flattening in which a gear wheel of the emergency operating device engages in a non-rotatable and axially displaceable manner.

8. Parking brake system according to claim 1, wherein a gear wheel of the power operating device, during the drive of the threaded spindle by way of the emergency operating device, is fixed with respect to a rotation.

9. Parking brake system according to claim 8, wherein the rotation of the gear wheel is prevented by the self-lockingly designed mechanical transmission of the power operating device.

10. Parking brake system according to claim 1, having a force transmitting device between the threaded spindle and the parking brake which transmits the adjusting movement of the threaded spindle to the parking brake, wherein a bearing device which is arranged between the threaded spindle and the force transmitting device and which causes an uncoupling of the rotating movement of the threaded spindle from the axial movement.

11. Parking brake system according to claim 1, wherein the spindle is constructed as a hollow shaft through an interior of said spindle at least one element of the force transmitting device is guided.

12. Parking brake system according to claim 1, wherein an operating element by which a vehicle user can apply a rotating movement to a shaft is arranged between the operating element and the mechanical transmission of the emergency operating device.

13. Parking brake system according to claim 12, wherein the shaft can be telescoped.

14. Parking brake system according to claim 12, wherein on an end section facing the operating element, the shaft is bent for forming a lever arm, and the operating element is formed by an oblong grip end which on an end area is hinged to the bent end section of the shaft so that the operating element can take up a first position transversely to the longitudinal axis of the shaft, with a form closure to the bent end section, and a second, freely rotating position in parallel to the longitudinal axis of the shaft.

15. Parking brake system according to claim 12, wherein the operating element is constructed as an approximately T-shaped grip which has a rotatably disposed button extending at a distance and in parallel to the longitudinal axis of the shaft, which button can be pulled out for forming a crank.

16. Parking brake system according to claim 12, wherein the shaft has two joints in the area of an end section facing an operator of the vehicle, which said joints permit an approximately Z-shaped bending of two sections formed by the joints so that the shaft forms a crank section with a lever arm.

17. Parking brake system according to claim 12, wherein during the power operation, the rotating movement of the threaded spindle is prevented by a form-locking fixing of the operating element of the emergency operating device.

18. Parking brake system according to claim 1, wherein the emergency operating device has an operating element which, in an inoperative position, can be displaced into a recess of an element of interior fittings of the vehicle.

19. Parking brake system according to claim 1, wherein a wind-around spring is provided on the emergency operating device for protection against rotation.

20. Parking brake system according to claim 19, having a shaft by way of which a user of the vehicle can apply a rotating movement to the mechanical transmission of the emergency operating device, wherein the shaft is divided into two sections which engage in one another in a form-locking manner and thereby can be rotated with respect to one another to a limited extent, the wind-around spring being triggered by way of the limited rotation of the sections.

21. Parking brake system according to claim 19, wherein the wind-around spring is arranged close to the mechanical transmission of the emergency operating device.

22. Parking brake system according to claim 1, having a force transmitting device between the threaded spindle and the parking brake which transmits the adjusting movement of the threaded spindle to the parking brake, wherein the force transmitting device comprises a rocker which is tiltably arranged on the threaded spindle and accommodates two Bowden cables leading to the parking brakes.

23. Parking brake according to claim 22, wherein the rocker is linked by way of a bolt with a spherical head to the threaded spindle.

24. Parking brake according to claim 22, wherein a device for the automatic threading of the Bowden cables into the rocker is provided.

25. Parking brake according to claim 1, wherein in the area of a triggering device, in which the power operating device and the emergency operating device are combined, an adjusting device is provided for compensating wear and settling phenomena in the parking brake system.

26. Parking brake according to claim 25, the spindle being constructed as a hollow shaft through an interior a rod is guided for transmitting the brake locking force, wherein the adjusting device comprises a carriage which can be displaced together with the spindle along a longitudinal axis, the carriage has a tooth element which interacts with the rod by way of a releasable locking, when the parking brake is released, the tooth element being disengaged from the rod, and a spring element supported with respect to the body of the vehicle exercises a pretressing onto the rod which acts against a restoring force of the parking brake.

27. Parking brake according to claim 26, wherein stop slopes are provided which permit a self-threading inserting of the rod into the triggering device.

\* \* \* \* \*